United States Patent [19]

Bove et al.

[11] 4,132,338

[45] Jan. 2, 1979

[54] APPARATUS SUITABLE FOR USE IN THE AUTOMATIC WELDING OF PIPES

[75] Inventors: Ottavio Bove, San Donato Milanese (Milan); Ugo Cannata, Albissola Marina (Savona), both of Italy

[73] Assignees: Saipem S.p.A.; Arcos Saldatura Elettrica Autogena S.p.A., both of Italy

[21] Appl. No.: 676,806

[22] Filed: Apr. 14, 1976

[30] Foreign Application Priority Data

Apr. 17, 1975 [IT] Italy ............................ 22433 A/75

[51] Int. Cl.² ................................................ B23K 37/02
[52] U.S. Cl. ........................................ 228/27; 228/29
[58] Field of Search ...................................... 228/27, 29

[56] References Cited

U.S. PATENT DOCUMENTS

| | | | |
|---|---|---|---|
| 3,331,545 | 7/1967 | Olivieri | 226/187 |
| 3,604,612 | 9/1971 | Miller | 228/29 X |
| 3,619,552 | 11/1971 | Cape | 228/27 X |
| 3,844,468 | 10/1974 | Nelson et al. | 228/29 X |
| 3,963,895 | 6/1976 | Hennion | 228/27 |

*Primary Examiner*—Al Lawrence Smith
*Assistant Examiner*—K. J. Ramsey
*Attorney, Agent, or Firm*—Morgan, Finnegan, Pine, Foley & Lee

[57] ABSTRACT

The present invention relates to an apparatus suitable for use in the automatic welding of pipes. The apparatus according to the invention comprises a fixed part or rail band which is clamped around the pipe at a prefixed position and a moving part which is driven with an orbital motion along the rail band and supports a swinging welding torch, a welding rod feeding mechanism and a torch position adjusting mechanism. The swinging motion of the welding torch is produced by a pneumatic system which permits both the amplitude and the frequency of said swinging motion to be adjusted. It is also possible to produce high swing frequencies and various times of stoppage for the torch at the ends of the swinging motion.

8 Claims, 6 Drawing Figures

APPARATUS SUITABLE FOR USE IN THE AUTOMATIC WELDING OF PIPES

The present invention relates to an apparatus provided with an orbital motion, hereinafter called simply orbital apparatus, suitable for use in the automatic welding of pipes. The apparatus, besides being simple, light, easily and quickly assembled and disassembled and non-cumbersome, provides a plurality of performances in a rather simple and accurate manner without the necessity of stopping the orbital motion or replacing components.

An orbital apparatus generally comprises a fixed part or rail band which is placed and clamped around the pipe at a prefixed position with relation to the edge to be welded, and a moving part which is movably coupled to the sides of said fixed rail band by means of four grooved sliding wheels. The moving part is moved along said rail band by a knurled pinion kept pressed against one of the said sides of the rail band and operated by an electric motor. The moving portion supports the welding lance, the feeder for the welding rod as well as the mechanisms for adjusting in position and for swinging the welding lance.

Now, the present invention relates specifically to an orbital welding apparatus which includes a new kind of rail band having a quick clamp arrangement, a mechanism allowing a quick and reliable coupling of the moving part to the rail band, a mechanism keeping the driving pinion resiliently pressed against one side of the rail band without skidding, a mechanism for dragging the welding rod comprising a plurality of driving wheels and adjustable balancing means, asynchronous electric motors for operating the said driving pinion and the dragging mechanism. The swinging motion of the welding lance, is generated by a pneumatic system permitting adjustment during the swing of the lance of both the amplitude and the frequency of the swing. The system also produces high swing frequencies and permits stopping the lance for a prefixed time at the one or the other or both of the ends of the stroke during its swinging motion. The invention speeds up, makes easier, improves and economizes the operation of both an ascending and descending automatic welding of pipes having a large diameter since it allows and makes easy and immediate the passing of the welding rod from one pass to the following one without the necessity of stopping the orbital motion or replacing the moving part or some components thereof.

The increased demand for laying pipelines on land or offshore for conveying oils or gases has produced a need to speed up the welding cycle in order to reduce the cost of the welding operation to a competitive value and to minimize the time required by the laying operation. This is very important above all in an offshore laying where the changeable weather conditions require the laying to be carried out in as short a time as possible. These factors have led to a remarkable development of apparatus suitable for use in the automatic welding of pipes.

Now, the orbital apparatus known to the prior art for the automatic welding of pipes present all sorts of drawbacks of an operative and economical character the biggest of which is due to the low adaptability of said known apparatus in comparison with the plurality of tasks which they have to accomplish and given the fact that these known apparatus are all made in such a way to perform exclusively a single order of passes.

In fact in the prior art, the welding of a pipe is always carried out by means of a set of subsequent passes, each of which requires a lifting of the lance and an increase in the swing amplitude of the same lance.

Now, in the known orbital welding apparatus the swing of the lance or welding head is obtained simply by means of a cam operated by an electric motor. It will be hence easily understood that with such a mechanical system the amplitude of the swing of the lance remains fixed and may be varied only by stopping the orbital motion of the moving part of the apparatus and replacing various parts of the latter resulting in a considerable loss of time.

On the other hand the above mentioned mechanical system also does not permit high frequencies in the swing of the lance. This makes it impossible for known apparatus to lay a weld bead having specifications in harmony with the welding rules during passes of narrow amplitude, and hence it is impossible to carry out the first pass which has to be always made by other welding means such as internal couplers having a welding action.

Furthermore in the prior art, the limited swing frequency obtainable makes it necessary to frequently adjust the orbital speed of the moving part to avoid the casting of the melted material and obtaining a regular laying. Consequently, there is the necessity of a continuous and careful presence of an operator.

In the known apparatus, then, stoppages are not possible at the ends of the stroke of the swinging motion of the lance in order to meet critical welding specifications. Furthermore, the fixed part or rail band of the conventional orbital welding apparatus comprises a chain or a simple iron strip with a thickness suitable to support the weight of the moving part, i.e., a strip rather thick and only slightly resilient. Both of these items do not allow the fixed part to adapt itself perfectly to the geometrical shape of whatever pipe is being welded and they require frequent adjustments of the position of the lance during the welding pass, and therefore the continuous and careful presence of an operator.

Furthermore, the known rail bands are clamped around a pipe by means of systems which are neither simple nor quickly mounted and the ends of the rail bands, being placed one upon another, double the thickness of the rail bands so that the sliding wheels of the moving part of the orbital apparatus have to be provided with two grooves. This gives rise to losses of time and constructional complications as well as to the necessity of adjusting the position of the lance at the zone where the ends of the rail bands are placed one upon another.

The coupling of the moving part of conventional welding apparatus to the relevant rail band is then carried out in subsequent steps, by first resiliently pressing against the side of the rail band one sliding wheel and then successively coupling the other sliding wheels. This gives rise to a remarkable loss of time and mounting complications.

The knurled pinion operated by an electric motor and transmitting the orbital motion to the moving part of the known apparatus by means of its pressure against a side of the rail band, is furthermore directly supported by the bedplate of the said moving part so that the adhesion between the pinion and the said side of the rail band does not remain constant and the orbital motion of the moving part around the pipe to be welded may be subjected to variations in speed.

Finally, in known orbital apparatus the welding rod is fed or dragged by a mechanism including dragging wheels, which does not assure an effective adhesion between the said wheels and the said rod and hence skiddings may occur under stress, which compromise the success of the welding.

An object of the present invention is to eliminate the above-said drawbacks of the prior art and to provide an orbital apparatus suitable for use in the automatic welding of pipes, which apparatus may be easily and quickly assembled and is reliable. The apparatus carries out all the welding passes, the first pass included, by merely adjusting controlling means located on the bedplate of the moving part without it being necessary to vary the orbital speed or to stop the orbital motion of the said moving part.

This is due to the fact that the swinging motion is imparted to the welding lance by a pneumatic system high swing frequencies. It is also possible to adjust, during the orbital motion of the moving part and also during the swing of the same lance, the amplitude and the frequency of the said swinging motion as well as to impose various times of stoppage for the lance at the ends of its swing.

In such a way, in fact, by imposing high swing frequencies and suitable times of stoppage it is not only possible to carry out the first welding pass with the apparatus of the invention, but also all the other welding passes may be carried out by the same apparatus without varying the orbital speed of the moving part or stopping the orbital motion of said moving part.

According to an embodiment of the present invention the said pneumatic system comprises a double-acting pneumatic cylinder whose plunger is made integral with the welding head. A two-position several-way valve alternately and successively connects the opposed chambers of the said cylinder to a compressed air source and a duct communicating with the atmosphere through a discharge regulator. This permits varying the frequency of the said swinging motion, the amplitude of said swinging motion being defined by the permissible stroke of a vertical plate fixed to the said plunger. The plate is located between two opposed small cylinders acting as shoulders which may be manually approached or moved away the one as to the other by means of a screw adjuster and each comprises a plunger provided with axial holes and biased by a spring to keep closed an inlet port connected to the said compressed air source. This causes a pin fixed to it to come out of the shoulder cylinder towards the said vertical plate, the outlet ports of the said shoulder cylinders being connected to two commutating chambers respectively of the said valve through a timer comprising an adjustable throttling arrangement which may be connected to an expansion chamber. The motion of the lance is reversed everytime the said vertical plate knocks against the pin of one of the two shoulder cylinders and, by moving the plunger in opposition to the action of the spring, opens the relevant inlet port permitting the compressed air of the said source into one of the two commutating chambers of the said valve which, in turn, will operate instantly or after a certain time of stoppage according to the setting of the relevant timer.

According to another feature of the present invention, the fixed part or rail band of the apparatus comprises two opposed metallic straight edges having knurled outer sides and a C-shaped cross-section, which are connected to each other by a thin metallic sheet whose side ends are welded into the grooves of the said C-shaped straight edges. Pairs of spacers in form of studs are welded at a same distance from each other on the whole length of the lower surface of the said metallic sheet. This construction provides a rail band which is strong, very resilient and perfectly adaptable to the geometrical shape of the pipe to be welded and avoids the necessity of a continuous adjustment of the position of the lance during the welding pass.

According to another feature of the invention, the front ends of the fixed part or rail band of the apparatus present a thickness reduced to a half where they are placed one upon another, and are clamped to each other by means a quick toggle-action clamp. In such a way the said fixed part or rail band is easily and quickly assembled and disassembled on the pipe, while the evenness in the thickness of the sides of the rail band permits making use on the moving part of the apparatus of sliding wheels having a single groove.

According to another feature of the invention, the four grooved sliding wheels used for coupling the moving part of the apparatus to the relevant rail band are pivotally supported by the said moving part by means of corresponding pivots two of which are hinged on two stirrups directly welded to the moving part and the two other pivots are located on two stirrups welded to the ends of a T-shaped bar which is urged towards one side of the rail band by two adjustable springs, said bar being movable along a guide supported by the moving part and having a handle coming out of the said moving part.

The coupling of the moving part to the rail band and consequently the uncoupling too, can now be made in a very easy and quick way by manually acting on the said handle so as to move away from the one side of the rail band the two grooved sliding wheels supported by the said movable bar.

On the other hand, the fact that the pivots of the grooved sliding wheels are hinged on the said stirrups so that the said wheels can assume various orientations for adapting themselves to the different curvings of pipes of different diameter, allows a plurality of applications since there is now the possibility of making use of the apparatus of the present invention for automatically welding different kinds of pipes.

According to a further feature of the present invention, the knurled pinion dragging the moving part of the apparatus along the rail band is pivotally supported by a plate hinged at one of its side ends on the said moving part and urged towards one side of the rail band by an adjustable spring acting on the other side end of the plate and supported by the said moving part. Since the knurled pinion is always kept resiliently pressed against the said one side of the rail band, there is positive meshing between the driving pinion and the side of the rail band and hence, given the absence of possible skiddings, constancy in the orbital speed of the moving part along the rail band.

A further feature of the invention involves the mechanism for dragging or feeding the welding rod which comprises a set of aligned driving wheels opposed to a corresponding set of pressing wheels mounted on balancing means kept pressed against the said driving wheels by a spring loaded adjusting screw. The dragging pressure is in such a way contemporaneously transmitted to several points of the welding rod which avoids with certainty the possibility of skiddings which adversely affect the welding. On the other hand the possibility of adjusting the adhesion by means of the said adjusting screw permits not only imposing the optimal value for the adhesion, but also permits making use of welding rods having different diameters.

According to a further feature of the present invention, the knurled pinion driving the moving part of the apparatus along the rail band and the driven wheels of the mechanism for driving the welding rod are each operated, through reducing and transmitting gears, by a high frequency asynchronous electric motor.

In such a way there is the certainty about the absolute constancy both in the orbital speed of the moving part along the rail band and in the dragging speed of the welding rod. This provides perfect weld beads given the fact that the asynchronous electric motors provide advantages over the direct current electric motors used up to now of a high constancy in the speed during the change from a no-load to a full load condition and of an absolute insensitivity to the changes in the feeding voltage, since their speed depends exclusively on the frequency of said voltage.

Further features and embodiments of the present invention will be made clear hereinafter where the invention is illustrated in the accompanying drawings which are merely exemplary and nonlimiting embodiments, in that the adoption of constructional techniques or equivalent members different from those suggested herein lies within the scope of the present invention.

Referring now to the drawings, wherein corresponding elements are marked by the same numeral, reference numeral 1 indicates the edge to be welded of a pipe 2 around which the fixed part or rail band 3 of the orbital apparatus used for the automatic welding is positioned and clamped.

Said rail band 3 is constituted by two opposed metallic straight edges 4 and 5 presenting a substantially C-shaped cross-section (see specifically FIG. 5) and two knurled outer sides 4' and 5'.

Figure 5:
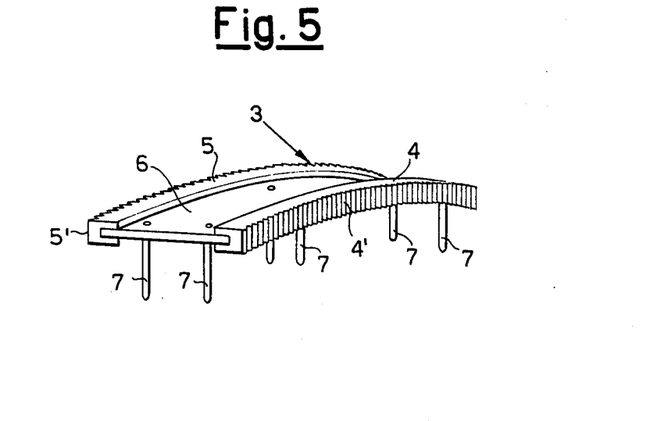
FIG. 5 shows a perspective view of a portion of the fixed part or rail band of the orbital apparatus according to the invention.

A thin metallic sheet 6 connects the said straight edges to each other by insertion into the grooves of the said C-shaped cross-sections and it is affixed thereto by welding.

At the lower surface of the sheet 6 pairs of spacers 7 in form of studs are welded thereto at a spaced distance apart in order to maintain a prefixed distance between the rail band 3 and the pipe 2.

The front ends 8 and 9 of the rail band 3 (see specifically FIG. 1) are placed one upon another in an overlapping relationship and can slide on each other, but, since their thickness is reduced by a half, they do not alter the thickness of the rail band. Said front ends 8 and 9 are then clamped to each other, in such a way as to rigidly fasten the rail band around the pipe such as, by means of a quick clamp device.

Figure 1:
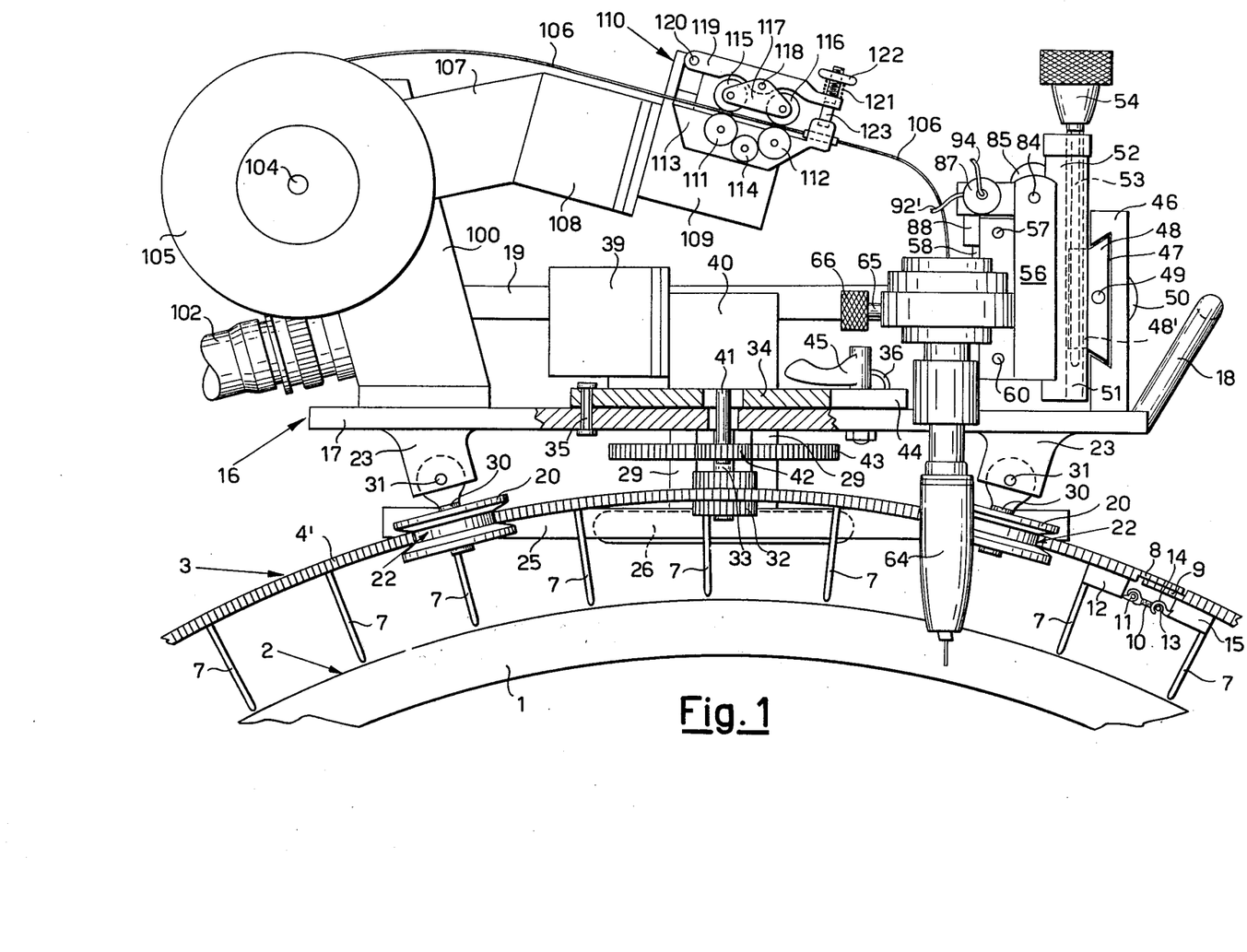
FIG. 1 shows a partially sectioned front view of the orbital apparatus for automatically welding pipes according to the invention.

In FIG. 1, there is illustrated a quick toggle-action clamp, which substantially comprises a bolt 10 hinged at 11 on a supporting block 12 welded to the sheet 6 near the front end 8 of the rail band 3. A wing nut 13 coupled to the bolt 10 is detained in a groove of a gripping hook 14 supported by another supporting block 15 welded to the sheet 6 near the other front end 9 of the rail band.

Such a device, besides allowing a quick uncoupling of the rail band by simply rotating the bolt 10, facilitates adaption of the same rail band on pipes having different diameters by screwing more or less of the said nut on the said bolt.

The moving part 16 of the orbital apparatus used for the automatic welding comprises a bedplate 17 having substantially a quadrangular shape, to two sides of which there are welded two handles, 18 and 19 respectively, for facilitating the coupling to or the uncoupling from the rail band 3 of the moving part 16.

Said bedplate 17 is coupled to the rail band 3 by means of four grooved sliding wheels, 20 and 21 respectively, into the grooves 22 of which the knurled sides 4' and 5' respectively of the rail band 3 are inserted.

The two grooved wheels 20 cooperate with the side 4' of the rail band and are pivotally supported by stirrups 23 (see FIG. 1) directly welded to the lower surface of the bedplate 17, while the two opposite grooved wheels 21 cooperate with the side 5' of the rail band and are pivotally supported by two stirrups 24 (see FIG. 3) welded respectively to the ends of a T-shaped bar 25.

Figure 3:
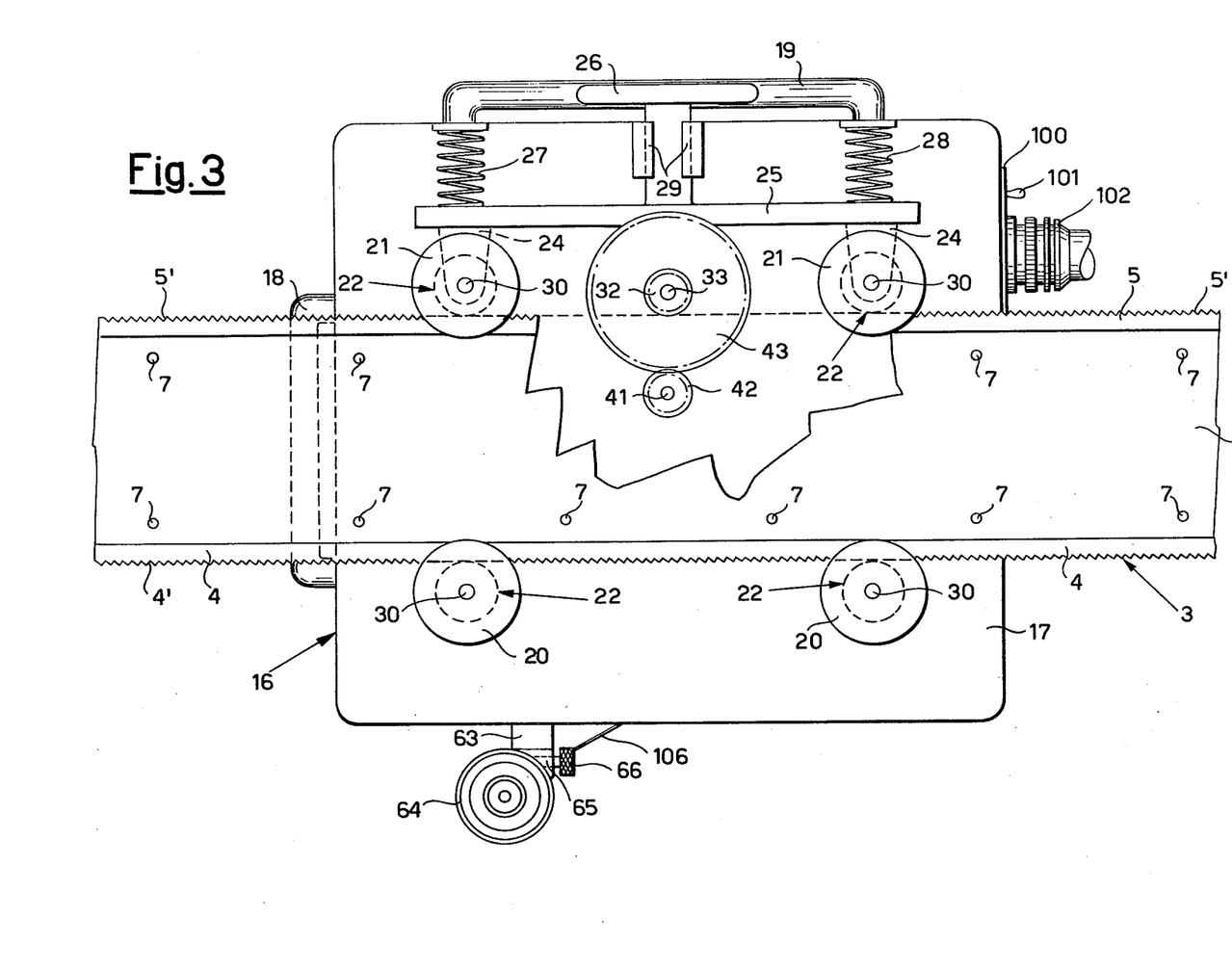
FIG. 3 shows a partially sectioned plan view made from the bottom and on a different scale of the orbital apparatus of FIG. 1.
Figure 4:
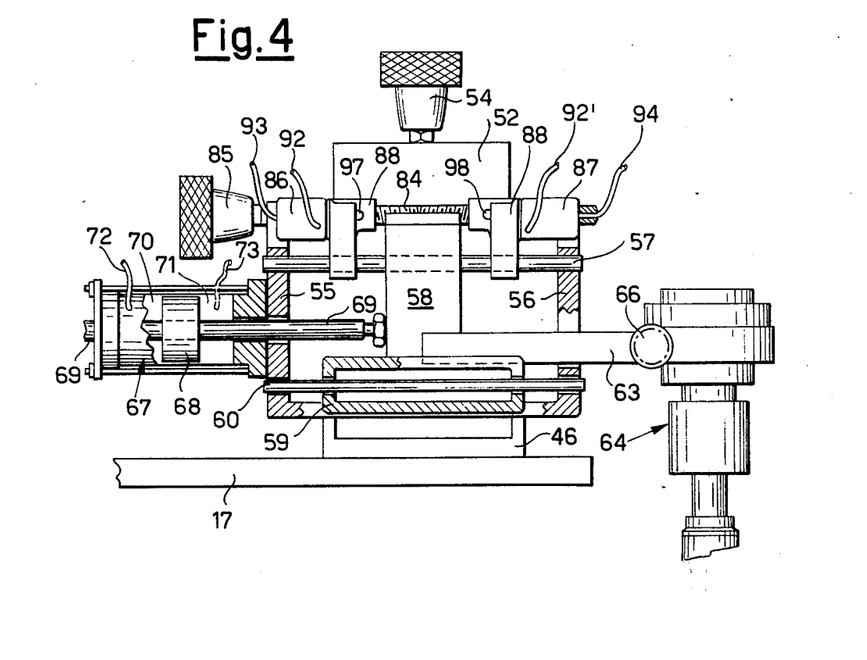
FIG. 4 shows a partially sectioned side view on a different scale of the apparatus, made according to line IV—IV in FIG. 2.

The bar 25 includes a handle coming out of the bedplate 17 and urged towards the side 5' of the rail band by two thrust springs 27 and 28. The springs 27 and 28 act on the ends of the bar 25 on the side of said bar opposite to that supporting the grooved sliding wheels 21. The bar 25 is guided during its shifting by a guide 29 welded to the lower surface of the bedplate 17.

Now it will be easily understood that with such a system not only the moving part 16 remains surely coupled to the rail band 3 given the fact that all the grooved sliding wheels are constantly kept pressed against the sides of the rail band by the said springs 27 and 28, but also an uncoupling operation can be carried out rapidly by simply acting on the handle 26 to move the wheels 21 away from the side 5' of the rail band.

Each of the four grooved sliding wheels 20 and 21 is pivotally supported by means of a pivot 30 hinged (see specifically FIG. 1) at 31 on the relevant supporting stirrup. The grooved sliding wheels 20 and 21 can thereby swing in a plane perpendicular to the pipe 2 and adapt themselves to a wide set of pipe diameters.

The orbital motion of the moving part 16 at a prefixed speed along the rail band 3 is obtained by means of a driving pinion 32 cooperating with the side 5' of the rail band. In order to keep the said driving pinion 32 always in touch with the side 5' without skidding, the driving shaft 33 of the pinion is not supported by the bedplate 17 but, passing through a hole in the latter, by a plate 34 hinged at one of its side ends by means of a pin 35 coupled to the bedplate 17. The plate 34 is urged towards the side 5' of the rail band 3 by an adjustable spring 36 hinged at 37 on the bedplate 17 and at 38 on the other side end of the plate 34.

The rotary motion to drive the moving part 16 is transmitted to the driving shaft 33 and consequently to pinion 32 by an asynchronous electric motor 39, supported by the said plate 34, through a reduction gear arrangement 40, also supported by the plate 34, which operates the shaft 41 of a gearwheel 42 meshed with a reducing gearwheel 43 keyed on the driving shaft 33.

A cam 44 hinged on the bedplate 17 and manually pivotable by means of a lever 45 mounted thereto permits rotation of the plate 34 in opposition to the action of the spring 36 and manual disconnection of the driving pinion 32 from the side 5' of the rail band 3 in order to make easy the coupling to and the uncoupling from the said rail band 3 of the moving part 16.

Near one side of the bedplate 17, a block 46 is then welded substantially perpendicular to the said edge 1 to be welded. The block 46 includes a dovetailed horizontal groove 47 along which a slider 48 may slide under the action of a horizontal groove 47 along which a slider 48 may slide under the action of a horizontal passing screw 49 which is supported by the said block and may be rotated by means of a knob 50.

The slider 48 protrudes from the said groove 47 with a part 48' entering a dovetailed vertical groove 51 presented by a substantially C-shaped frame 52 which may be vertically moved by a vertical passing screen 53 which is supported by said frame, is rotated by means of the knob 54 and engages the said part 48' of the slider 48. On the other hand the frame 52 may also be moved horizontally by acting on the said knob 50, since it is evidently integral with the slider 48 as to the horizontal shiftings.

Supported by the flanges 55 and 56 of the said C-shaped frame 52, a horizontal shaft 47 acts as a guide for a vertical plate 58 presenting at its lower part a slide 59 which is guided by a horizontal shaft 60 supported by the said flanges 55 and 56 too.

Figure 2:
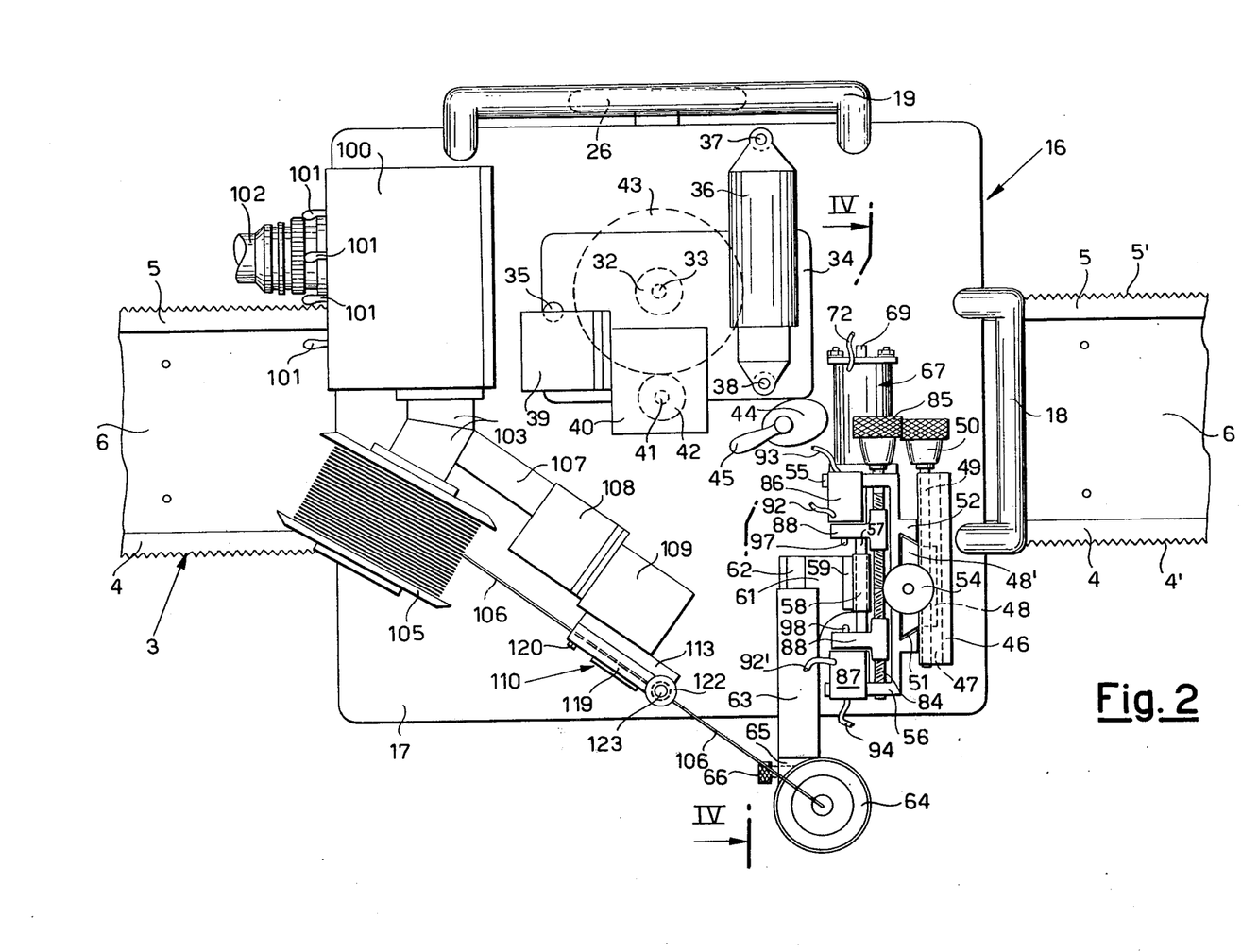
FIG. 2 shows a top plan view on a different scale of the orbital apparatus of FIG. 1.

The slide 59 extends outwardly with a horizontal plate 61 presenting a dovetailed guide 62 (see specifically FIG. 2) wherein an arm 63 is inserted supporting at its protruding end the welding lance 64 by means of a pivot 65 provided with a knob 66. The arm 63 may be fixed at every point of the guide 62 by means of a clamping system not shown in the drawings.

In such a way, the lance 64 supported by the frame 52 is not only easily and quickly positionable as to the edge to be welded, during its swinging motion too, by simply acting on the knobs 50 and 54 and, if necessary, shifting the arm 63 along the guide 62. The lance 34 may also assume whatever inclination is desired as to the said edge by adjusting knob 66.

The swinging motion of the lance 64 is obtained by means of a double-acting pneumatic cylinder 67 whose plunger 68 is made integral with the said vertical plate 58 by means of a horizontal connecting shaft 69.

Said pneumatic cylinder 67 is supported by the flange 55 of the frame 52 and its two active chambers 70 and 71 are connected, through the ducts 72 and 73 respectively, to a two-position several-way valve 74 (see specifically FIG. 6) whose commutator 75 permits alternately and successively connecting said chambers to the duct 76 of a compressed air source such as a compressor 77 through an air receiver 78 and a pressure reducer 79, and to the duct 80 communicating with the atmosphere through a discharge regulator 81. The commutator 75 is operated by the compressed air sent alternately into the one or the other of two commutating chambers 82 and 83 of the valve 74.

The amplitude of the swinging motion of the lance 64 is manually adjusted by means of a screw adjuster comprising a screw 84 provided with two opposed threads. The screw 84 is pivotally supported by the flanges 55 and 56 of the frame 52 and rotated by means of the knob 85 to mutually approach or to mutually move away at will two opposed small cylinders 86 and 87 acting as stopping shoulders for the permissible stroke, of the said vertical plate 58 and consequently of the said lance 64.

The said two small shoulder cylinders 86 and 87 are supported by movable supporting blocks 88 which are meshed respectively with the opposed threads of the screw 84 and guided at their lower parts by the said horizontal guiding shaft 57 as well. Each small shoulder cylinder 86 or 87 comprises (see specifically FIG. 6) a plunger 89 which is provided with axial holes 90 and urged by a spring 91 to keep closed an inlet port connected to the said compressed air source 77 through the duct 92 or 92' respectively.

The outlet ports of the small shoulder cylinders 86 and 87 are connected to the said commutating chambers 82 and 83 respectively of the valve 74 through the ducts 93 and 94 and the timers 95 and 96 respectively.

The plungers 89 also include pins 97 and 98 which protrude from the small cylinders 86 and 87 respectively. The pins 97 and 98 are integral with said plungers 89 and the vertical plate 58 presses thereagainst at every end of the stroke of its back and forth motion.

Figure 6:
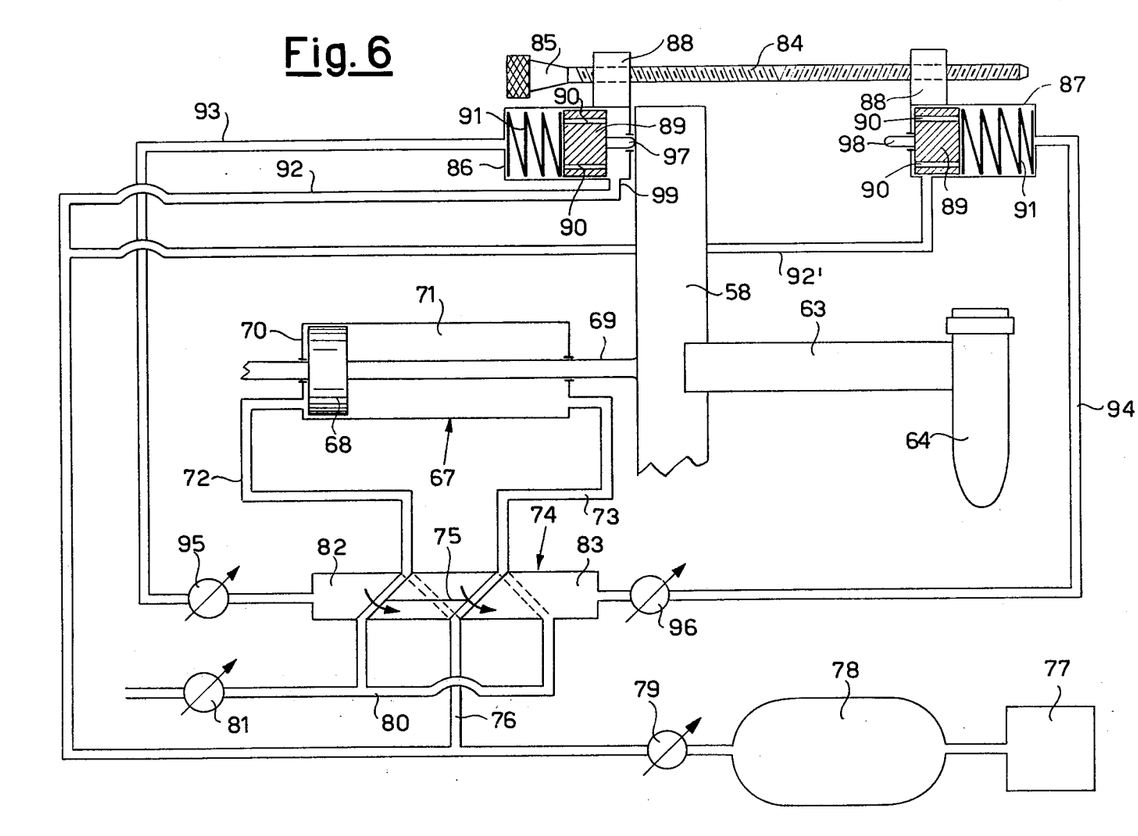
FIG. 6 shows the structural arrangement of the pneumomechanic system used in the orbital apparatus according to the invention.

The working of the pneumatic system imparting the swinging motion to the welding lance or head 64 and allowing it to adjust at will, during the orbital motion of the moving part and also during the swinging motion of the same lance, both the amplitude and the frequency of said swinging motion as well as to impose various times of stoppage for the lance at the ends of the swing, will be evident by making reference to FIG. 6 illustrating the structural arrangement of said system.

The knob 85 is used to manually adjust the distance between the small shoulder cylinders 86 and 87 limiting the stroke of the vertical plate 58 and of the lance 64 integral with the latter, and consequently the amplitude of the swinging motion of said head. Air from the source 77, 78, 79, by passing through the duct 76, the valve 74 and the duct 73, is conveyed into the active chamber 71 of the cylinder 67 which moves the vertical plate 58 to the left and hence the lance 64 with a speed depending on the velocity with which the air contained in the active chamber 70 of the cylinder 67 may be discharged to the atmosphere through the ducts 72 and 80 and the discharge regulator 81.

It will thus be easily understood that it is possible to vary the speed wherewith the lance 64 may be moved and consequently the frequency of the swinging motion of said lance, by adjusting on the said discharge regulator 81. On the other hand, since the swinging motion of the lance 64 is obtained pneumatically, high swing frequencies may now be produced.

When the vertical plate 58, during its shifting to the left, knocks against the protruding pin 97 of the small shoulder cylinder 86, it moves the plunger 89 in opposition to the action of the spring 91 and opens the inlet port 99. The compressed air from the duct 92 passes thus, through the holes 90, into the duct 93 and, after a certain time delay set by the timer 95, into the commutating chamber 82 of the valve 74. Commutator 75 of the valve 74 will move to the right, in the position shown in dotted lines in FIG. 6, only after a certain time of stoppage which is adjustable from zero to a prefixed value by means of the timer 95.

With the commutator 75 in this new position, the compressed air in the duct 76 is now conveyed, through the duct 72, into the active chamber 70 of the cylinder 67 and the vertical plate 58 and consequently the lance 64 are moved to the right till the vertical plate 58 knocks against the pin 98 of the small shoulder cylinder 87. At this point compressed air is conveyed into the commutating chamber 83 of the valve 74 through another timer 96, with the consequence that the commutator 75 of said valve is again moved to the left after a certain prefixed time of stoppage.

The valve 74 as well as the timers 95 and 96 and the discharge regulator 81 are contained in a control box 100 mounted on the other side of the bedplate 17 opposite to the side where the lance supporting mechanism is mounted.

In the control box 100 there are all the centralized controls for the moving part 16, i.e., the speed regulators for the orbital speed of the moving part and for the dragging or feeding speed of the welding rod as well as the switches 101 for operating the asynchronous motors and the said valve 74.

A single union 102 feeds to the moving part 16 of the orbital apparatus the driving fluid (compressed air) for operating the pneumatic system, the gases suitable for use in the welding and the electric current necessary to the welding and for operating the said asynchronous motors.

To a side of the control box 100 there is then welded an elbowed element 103 supporting the pivot 104 for the bobbin 105 of the welding rod 106, which element presents a projecting arm 107 supporting in turn an asynchronous electric motor 108, a reduction gear arrangement 109 as well as the mechanism 110 for feeding the welding rod.

Said feeding mechanism 110 comprises two grooved driving wheels 111 and 112 pivotally mounted on a supporting member 113 fixed to the box of the reduction gear arrangement 109, which wheels are both meshed with toothed wheel 114 moved by the reduction gear 109 operated by the asynchronous motor 108.

The welding rod 106 is then pressed into the grooves of the driving wheels 111 and 112 by two opposed pressing wheels 115 and 116. The wheels 111 and 112 are grooved and pivotally mounted on a balancing means 117 hinged at 118 on a lever 119 which is fulcrumed at 120 on the said supporting member 113 and urged towards the driving wheels 111 and 112 by a spring 121 loaded by an adjusting screw comprising a knurled nut 122 cooperating with a screw 123 which is supported by the said supporting member 113 and passes through the said lever 119. The spring 121 is mounted on said screw 123 and is compressible between the said knurled nut and the said lever.

What is claimed is:

1. An automatic pipe welding apparatus comprising:
a rail band which is fixedly mounted about the pipe in a predetermined relationship with respect to the edge of the pipe to be welded, and, said rail band having at least one knurled outer side, and,
a moving part which is movably coupled to the sides of the rail band comprising a single frame portion, at least one pair of grooved sliding wheels pivotally mounted on the lower portion of the frame and movably coupled to each side of the rail band, driving means mounted on the frame, a knurled driving pinion coupled to the driving means and cooperating with a knurled side of said rail band for driving the moving part about the rail band with an orbital motion, a welding head supported by the moving part and capable of swinging transversely with regard to the edge to be welded, a welding rod feeding mechanism and a mechanism for adjusting the position of the welding head with respect to the edge to be welded mounted on the moving part, and,
means for quickly coupling the moving part to the rail band and means for keeping the driving pinion in positive engagement with one side of the rail band, and,
a pneumatic system coupled to the welding head to impart a swinging motion thereto and permitting adjustment of the amplitude and frequency of said motion to produce high swing frequencies and stopping of the welding head at an end of its swinging motion, said pneumatic system comprising a compressed air source, a double acting pneumatic cylinder having a plunged integral with the welding head, a two-position several-way valve alternately and successively connecting the opposed chambers of the double acting cylinder to the compressed air source and including two commutating chambers, a discharge regulator coupled at one end to the valve and at the other end to the atmosphere in order to vary the frequency of the swinging motion of the head, a plate mounted substantially at right angles to the plunger and mounted to the welding head, a pair of adjustably positioned opposed cylinders having the plate located therebetween defining the amplitude of the swinging motion of the welding head, said cylinders each comprising:
a plunger mounted within the cylinder and having axial holes therethrough and said cylinder having an inlet port, and
a pin mounted to the plunger and extending outside the cylinder to engage the plate,
a timer connected to each of the outlet ports of the cylinders and to the respective commutating chamber of the valve,
whereby the motion of the welding head is reversed everytime the plate engages the pin of one of the cylinders moving the plunger so as to open a particular inlet port admitting compressed air into a corresponding cylinder chamber which will operate instantly or after a predetermined time set by the relevant timer.

2. An automatic pipe welding apparatus comprising:
a rail band which is fixedly mounted about the pipe in a predetermined relationship with respect to the edge of the pipe to be welded, and, said rail band having at least one knurled outer side, two opposed metallic straightedges having knurled outer sides and a C-shaped cross-section, a metallic sheet having side edges which are affixed in the grooves of the C-shaped straightedges, and, pairs of spacers mounted at a set distance from each other to the bottom of the metallic sheet and engaging the pipe at the other end, and,
a moving part which is movably coupled to the sides of the rail band comprising, a single frame portion, at least one pair of grooved sliding wheels pivotally mounted on the lower portion of the frame, and, movably coupled to each side of the rail band, driving means mounted on the frame, a knurled driving pinion coupled to the driving means and cooperating with a knurled side of said rail band for driving the moving part about the rail band with an orbital motion, a welding head supported by the moving part and capable of swinging transversely with regard to the edge to be welded, a welding rod feeding mechanism and a mechanism for adjusting the position of the welding head with respect to the edge to be welded mounted on the moving part, and, means for quickly coupling the moving part to the rail band and means for keeping the driving pinion in positive engagement with one side of the rail band, and, a pneumatic system coupled to the welding head to impart a swinging motion thereto and permitting adjustment of the amplitude and frequency of said motion to produce high swing frequencies and stopping of the welding head at an end of its swinging motion.

3. An automatic pipe welding apparatus comprising:

a rail band which is fixedly mounted about the pipe in a predetermined relationship with respect to the edge of the pipe to be welded, and, said rail band having at least one knurled outer side, and, a moving part which is movably coupled to the sides of the rail band comprising, a single frame portion, at least one pair of grooved sliding wheels pivotally mounted on the lower portion of the frame, and, movably coupled to each side of the rail band, driving means mounted on the frame, a knurled driving pinion coupled to the driving means and cooperating with a knurled side of said rail band for driving the moving part about the rail band with an orbital motion, a welding head supported by the moving part and capable of swinging transversely with regard to the edge to be welded, a welding rod feeding mechanism and a mechanism for adjusting the position of the welding head with respect to the edge to be welded mounted on the moving part, and, means for quickly coupling the moving part to the rail band and means for keeping the driving pinion in positive engagement with one side of the rail band, said means comprising, a T-shaped bar movable towards one side of the rail band, a guide mounted on the moving part and guiding the elongated portion of the T-shaped bar, a first pair of stirrups, having a pivot hinged on each stirrup and having a grooved wheel mounted thereto, mounted to the base of the bar and extending outwardly therefrom so that the wheels engage one side of the rail band, spring means mounted on the opposite side of the base from the first pair of stirrups and urging the grooved wheels into engagement with one side of the rail band, a second pair of stirrups fixedly mounted to the moving part, each having a pivot hinged thereon and a grooved wheel coupled thereto and in engagement with the other side of the rail band, and, a handle mounted to the end of the elongated portion of the T-shaped bar for manual movement disengaging or engaging the spring urged grooved wheels with the rail band, and, a pneumatic system coupled to the welding head to impart a swinging motion thereto and permitting adjustment of the amplitude and frequency of said motion to produce high swing frequencies and stopping of the welding head at an end of its swinging motion.

4. An automatic pipe welding apparatus comprising:

a rail band which is fixedly mounted about the pipe in a predetermined relationship with respect to the edge of the pipe to be welded, and said rail band having at least one knurled outer side, and, a moving part which is movably coupled to the sides of the rail band comprising, a single frame portion, at least one pair of grooved sliding wheels pivotally mounted on the lower portion of the frame, and, movably coupled to each side of the rail band, driving means mounted on the frame, a knurled driving pinion coupled to the driving means and cooperating with a knurled side of said rail band for driving the moving part about the rail band with an orbital motion, a welding head supported by the moving part and capable of swinging transversely with regard to the edge to be welded, a welding rod feeding mechanism and a mechanism for adjusting the position of the welding head with respect to the edge to be welded mounted on the moving part, comprising:

a block mounted perpendicularly on the moving part with respect to the edge to be welded, a horizontal dove-tailed groove on said block, a slider mounted within the dove-tailed groove, a horizontal passing screw supported by the block and driving said slider, a C-shaped frame having a vertical dove-tailed groove also engaged by a portion of said slider, said frame also supporting the pneumatic system and being coupled to the welding head, and, means for vertically shifting said frame, said means also engaging the slider, and, means for quickly coupling the moving part to the rail band and means for keeping the driving pinion in positive engagement with one side of the rail band, and, a pneumatic system coupled to the welding head to impart a swinging motion thereto and permitting adjustment of the amplitude and frequency of said motion to produce high swing frequencies and stopping of the welding head at an end of its swinging motion.

5. An apparatus according to claim 1 wherein:

the said timers each include means for adjustably throttling the flow of compressed air.

6. An apparatus according to claim 1 further including:

a timer connected between the two-position valve and the compressed air source, and, an expansion chamber connected between the compressed air source and the timer.

7. An apparatus according to claim 1 wherein:

the vertical plate includes an arm mounted thereto, a pivot supported by said arm and having the welding head affixed thereto, said arm being fixable at every point of a horizontal dove-tailed guide provided by the plate.

8. An apparatus according to claim 2 wherein the quick-action toggle clamp comprises:

a supporting block mounted on the metallic sheet near one of the front ends of the rail band, a bolt hinged on said block, a second supporting block mounted on the metallic sheet near the other front end of the rail band and having a gripping hook thereon, and, means readily joining the gripping hook to said bolt.

* * * * *

UNITED STATES PATENT AND TRADEMARK OFFICE
CERTIFICATE OF CORRECTION

PATENT NO. : 4,132,338
DATED : January 2, 1979
INVENTOR(S) : Ottavio Bove and Ugo Cannata It is certified that error appears in the above-identified patent and that said Letters Patent are hereby corrected as shown below:

Col. 3, line 20, After "system" insert --producing--.

Col. 11, line 24, Correct the spelling of "predetermined".

Signed and Sealed this

Twenty-first Day of August 1979

[SEAL]

Attest:

LUTRELLE F. PARKER
Attesting Officer    Acting Commissioner of Patents and Trademarks